(12) United States Patent
Schmidt

(10) Patent No.: US 6,683,283 B2
(45) Date of Patent: Jan. 27, 2004

(54) APPARATUS AND METHOD FOR HEATING INJECTION MOLDING FLUID

(75) Inventor: Harald Schmidt, Georgetown (CA)

(73) Assignee: Dynisco Hot Runners Inc. Canada, Ontario (CA)

( * ) Notice: Subject to any disclaimer, the term of this patent is extended or adjusted under 35 U.S.C. 154(b) by 0 days.

(21) Appl. No.: 10/200,488

(22) Filed: Jul. 23, 2002

(65) Prior Publication Data

US 2003/0209532 A1 Nov. 13, 2003

(Under 37 CFR 1.47)

Related U.S. Application Data

(60) Provisional application No. 60/378,945, filed on May 10, 2002.

(51) Int. Cl.[7] .............................. H05B 3/42; H05B 3/06; B29C 45/20
(52) U.S. Cl. ........................ 219/424; 219/535; 219/544; 219/548; 425/549; 264/328.15
(58) Field of Search ................................ 219/424, 426, 219/521, 534–536, 544, 546, 548; 425/549; 264/328.15

(56) References Cited

U.S. PATENT DOCUMENTS

| 3,535,742 A | 10/1970 | Marcus | 18/30 |
| 3,780,764 A | 12/1973 | Geist | 137/613 |

(List continued on next page.)

FOREIGN PATENT DOCUMENTS

| CA | 1204906 | 5/1986 | |
| CA | 2246771 | 1/2002 | |
| DE | 203 41 63 | 2/1971 | |
| DE | 24 01 168 | 7/1975 | ........... B29F/1/002 |
| DE | 299 09 535 | 8/1999 | ........... B29C/45/77 |
| DE | 19811466 A1 | 9/1999 | ........... B29C/45/28 |
| EP | 0 911 137 | 4/1999 | ........... B29C/45/16 |
| EP | 1 052 078 A1 | 11/2000 | ........... B29C/45/57 |
| EP | 1 142 686 A1 | 10/2001 | ........... B29C/45/30 |
| JP | 58-142833 | 8/1983 | ............. B29F/1/03 |
| JP | 60-212321 | 10/1985 | ........... B29C/45/77 |
| JP | 61-63428 | 4/1986 | ........... B29C/45/30 |
| WO | WO 97/43105 | 11/1997 | ........... B29C/45/30 |
| WO | WO 98/56564 | 12/1998 | ........... B29C/45/80 |
| WO | WO 99/54109 | 10/1999 | ........... B29C/45/30 |
| WO | WO 99/59795 | 11/1999 | ........... B29C/45/27 |
| WO | WO 01/08462 | 2/2001 | |
| WO | WO 02/36324 A1 | 2/2002 | ........... B29C/45/27 |

OTHER PUBLICATIONS

Kazmer, David O., et al., "Multi–Cavity Pressure Control in the Filling and Packing Stages of the Injection Molding Process," *Polymer Engineering and Science* (Nov., 1997) vol. 37, No. 11: 1865–1879.

Kazmer, David O., et al., "The Process Capability of Multi–Cavity Pressure Control for the Injection Molding Process," *Polymer Engineering and Science* (Nov., 1997) vol. 37, No. 11: 1880–1895.

(List continued on next page.)

*Primary Examiner*—Joseph Pelham
(74) *Attorney, Agent, or Firm*—Kudirka & Jobse, LLP

(57) ABSTRACT

A heater assembly for mounting around a fluid flow channel in an injection molding apparatus, the heater assembly comprising: an inner tube comprising a first heat conductive material having a first coefficient of thermal expansion, the inner tube having a selected longitudinal length, an inner surface, an outer surface; a first ring having an inner surface engaged around the outer surface of the inner tube along short selected length of the longitudinal length of the inner tube, the first ring comprising a second material having a second coefficient of thermal expansion that is less than the first coefficient of thermal expansion; a heater mechanism that heats the inner tube to a selected elevated temperature.

21 Claims, 6 Drawing Sheets

U.S. PATENT DOCUMENTS

| | | | | |
|---|---|---|---|---|
| 3,820,928 | A | 6/1974 | Lemelson | 425/146 |
| 3,861,841 | A | 1/1975 | Hanning | 425/146 |
| 3,952,927 | A | 4/1976 | Schaumburg et al. | 222/510 |
| 4,389,002 | A | 6/1983 | Devellian et al. | 222/146 |
| 4,500,279 | A | 2/1985 | Devellian et al. | 425/548 |
| 4,521,179 | A | 6/1985 | Gellert | 425/548 |
| 4,588,367 | A | 5/1986 | Schad | 425/549 |
| 4,592,711 | A | 6/1986 | Capy | 425/144 |
| 4,701,292 | A | 10/1987 | Valyi | 264/155 |
| 4,747,770 | A | 5/1988 | Schmidt | 425/549 |
| 4,755,131 | A | 7/1988 | Schmidt | 425/549 |
| 4,768,945 | A | 9/1988 | Schmidt et al. | 425/549 |
| 4,793,795 | A | 12/1988 | Schmidt et al. | 425/549 |
| 4,863,369 | A | 9/1989 | Schad et al. | 425/547 |
| 4,931,234 | A | 6/1990 | Schad et al. | 264/40.1 |
| 4,932,854 | A | 6/1990 | Matsuda et al. | 425/144 |
| 5,007,821 | A | 4/1991 | Schmidt | 425/548 |
| 5,009,718 | A | 4/1991 | Schmidt | 136/232 |
| 5,078,589 | A | 1/1992 | Osuna-Diaz | 425/562 |
| 5,141,696 | A | 8/1992 | Osuna-Diaz | 264/297.2 |
| 5,149,547 | A | 9/1992 | Gill | 425/145 |
| 5,192,555 | A | 3/1993 | Arnott | 425/544 |
| 5,225,662 | A | 7/1993 | Schmidt | 219/421 |
| 5,281,374 | A | 1/1994 | Matsuda et al. | 264/39 |
| 5,288,222 | A | 2/1994 | Wieser | 425/190 |
| 5,356,576 | A | 10/1994 | Fischbach | 264/40.4 |
| 5,360,333 | A | 11/1994 | Schmidt | 425/549 |
| 5,378,139 | A | 1/1995 | Schad et al. | 425/549 |
| 5,389,315 | A | 2/1995 | Yabushita | 264/40.1 |
| 5,492,467 | A | 2/1996 | Hume et al. | 425/549 |
| 5,545,028 | A | 8/1996 | Hume et al. | 425/549 |
| 5,554,395 | A | 9/1996 | Hume et al. | 425/549 |
| 5,556,582 | A | 9/1996 | Kazmer | 264/40.1 |
| 5,591,366 | A | 1/1997 | Schmidt et al. | 219/494 |
| 5,601,773 | A | 2/1997 | Schmidt et al. | 264/328.8 |
| 5,674,439 | A | 10/1997 | Hume et al. | 264/40.6 |
| 5,871,786 | A | 2/1999 | Hume et al. | 425/549 |
| 5,885,624 | A | 3/1999 | Katsuta et al. | 425/149 |
| 5,885,628 | A | 3/1999 | Swenson et al. | 425/549 |
| 5,894,025 | A | 4/1999 | Lee et al. | 425/562 |
| 5,916,605 | A | 6/1999 | Swenson et al. | 426/564 |
| 5,948,448 | A | 9/1999 | Schmidt | 425/192 R |
| 5,948,450 | A | 9/1999 | Swenson et al. | 425/562 |
| 5,980,237 | A | 11/1999 | Swenson et al. | 425/549 |
| 6,000,831 | A | 12/1999 | Triplett | 364/475.09 |
| 6,027,328 | A | 2/2000 | Herbst | 425/553 |
| 6,043,466 | A * | 3/2000 | Jenko et al. | 219/535 |
| 6,062,840 | A | 5/2000 | Lee et al. | 425/130 |
| 6,254,377 | B1 | 7/2001 | Kazmer et al. | 425/562 |
| 6,261,075 | B1 | 7/2001 | Lee et al. | 425/130 |
| 6,261,084 | B1 | 7/2001 | Schmidt | 425/564 |
| 6,287,107 | B1 | 9/2001 | Kazmer et al. | 425/562 |
| 6,294,122 | B1 | 9/2001 | Moss et al. | 264/328.9 |
| 6,309,208 | B1 | 10/2001 | Kazmer et al. | 425/562 |
| 6,343,921 | B1 | 2/2002 | Kazmer et al. | 425/145 |
| 6,343,922 | B1 | 2/2002 | Kazmer et al. | 425/145 |
| 6,361,300 | B1 | 3/2002 | Kazmer | 425/145 |
| 6,419,870 | B1 | 7/2002 | Lee et al. | 264/328.1 |
| 6,436,320 | B1 | 8/2002 | Kazmer et al. | 264/40.1 |

OTHER PUBLICATIONS

Kazmer, David O., "Dynamic Feed Control: A New Method for Injection Molding of High Quality Plastic Parts," *A Dissertation submitted to the Design Division of Mechanical Engineering and the Committee on Graduate Studies in Partial Fulfillment of the Requirements for the Degree of Doctor of Philosophy in Mechanical Engineering*, Jun. 1995, (ii–xix, 2–199).

Abstract—Japanese Publication No. 20 00141439, May 23, 2000, Kobe Steel Ltd., "Injection Compression Molding Device."

Abstract—Japanese Publication No. 58 142833, Aug. 25, 1983, Kobe Steel Ltd., "Control Method for Injection Molding Machine".

Abstract—Japanese Publication No. 60 212321, Oct. 24, 1985, Yazaki Kako KK, "Quantity Control of Resin for Injection Compression Molding".

Abstract—Japanese Publication No. 61 063428, Jan. 4, 1986, Nippon Densco Co. Ltd., "Mold Assembly".

Abstract—Japanese Publication No. 63 166511, Jul. 9, 1988, Nissei Plastics Ind. Co., "Injection Molding."

International Search Report, mailed Feb. 2, 1999, PCT/US98/10798.

International Search Report, mailed Jun. 22, 2001, PCT/US01/04674.

European Search Report, dated Feb. 28, 2001, EP Application No. 00 12 4358.

International Search Report, dated Mar. 8, 2002, PCT/US01/42795.

International Search Report, dated Jun. 5, 2002, PCT/US02/08364.

* cited by examiner

APPARATUS AND METHOD FOR HEATING INJECTION MOLDING FLUID

RELATED APPLICATIONS AND PATENTS

This application claims the benefit of priority under 35 U.S.C. §§119 and 120 to U.S. Provisional Application Ser. No. 60/378,945 filed May 10, 2002.

The disclosures of all of the following issued U.S. Patents are incorporated herein by reference in their entirety: U.S. Pat. No. 6,261,075, U.S. Pat. No. 6,343,922, U.S. Pat. No. 6,254,377, U.S. Pat. No. 6,343,921, U.S. Pat. No. 6,287,107, U.S. Pat. No. 6,309,208, U.S. Pat. No. 6,062,840, U.S. Pat. No. 6,294,122, U.S. Pat. No. 5,916,605, U.S. Pat. No. 5,980,237, U.S. Pat. No. 5,894,025, U.S. Pat. No. 5,871,786, U.S. Pat. No. 5,885,628, U.S. Pat. No. 5,948,448, U.S. Pat. No. 5,948,450, U.S. Pat. No. 5,674,439, U.S. Pat. No. 5,554,395, U.S. Pat. No. 5,545,028, U.S. Pat. No. 5,492,467, U.S. Pat. No. 4,389,002, U.S. Pat. No. 4,204,906.

BACKGROUND OF THE INVENTION

Injection molding processes and apparati typically involve heating materials which are solid at room temperature to elevated temperatures where the solid materials are converted to a fluid capable of flowing readily through tubes, barrels, bores and channels of various shapes and sizes that direct the fluid to the cavity of a mold where the fluid is cooled and formed into a solid part. Heating of the fluid flow channels in injection molding machine apparati and processes has been attempted in a variety of configurations and devices that have been designed to achieve the most efficient contact possible between a source of heat and the paths/channels through which the fluid is routed. In order to maintain injected fluid at an elevated temperature, various heating devices such as wires, coils, tubes and the like are placed in direct contact/engagement with the housings of the apparatus. Such heating devices/methods rely on conduction of heat throughout the body or matrix of the components to travel to the walls of the fluid flow channels.

SUMMARY OF THE INVENTION

The present invention relates to heating of a fluid flow channel in an injection molding apparatus, and more particularly to an apparatus and method for ensuring intimate contact between the heating device and the body of the apparatus or system component that is sought to be heated to an elevated temperature.

In accordance with the invention therefore there is provided in one embodiment, a heater assembly for mounting around a fluid flow channel in an injection molding apparatus, the heater assembly comprising: an inner tube comprising a first heat conductive material having a first coefficient of thermal expansion, the inner tube having a selected longitudinal length, an inner surface, an outer surface; a first ring having an inner surface engaged around the outer surface of the inner tube along short selected length of the longitudinal length of the inner tube, the first ring comprising a second material having a second coefficient of thermal expansion that is less than the first coefficient of thermal expansion; and, a heater mechanism that heats the inner tube to a selected elevated temperature.

The heater assembly may include an outer tube receiving and mounted around the outer surface of the inner tube, the first ring mounting the outer tube in a fixed position around the outer surface of the inner tube, the outer tube being mounted such that an inner surface of the outer tube is spaced a distance from the outer surface of the inner tube. The heater mechanism is typically mounted within the space between the inner ring and the outer ring.

The assembly preferably includes a second ring having an inner surface engaged around the outer surface of the inner tube along a second short selected length of the longitudinal length of the inner tube, the second ring comprising a third material having a third coefficient of thermal expansion that is less than the first coefficient of thermal expansion. The second ring mounts the outer tube in the fixed position around the outer surface of the inner tube in cooperation with the first ring.

The second material and the third material typically have the same or substantially the same coefficient of thermal expansion.

The short selected length typically extends from a first terminal end of the inner tube, the first ring being mounted at and around the first terminal end of the inner tube. The second short selected length typically extends from a second terminal end of the inner tube, the second ring being mounted at and around the second terminal end of the inner tube.

The inner tube and the first ring expand radially upon heating to select elevated temperatures, the second material of the first ring being selected such that the first ring expands less radially than the inner tube expands radially upon said heating, the first ring restricting radial expansion upon said heating. The inner tube and the second ring expand radially upon heating to select elevated temperatures, the third material of the second ring being selected such that the second ring expands less radially than the inner tube expands radially upon said heating, the second ring restricting radial expansion upon said heating.

The inner tube preferably includes a slot extending the longitudinal length of the inner tube.

The outer tube receives and is mounted around the outer surface of the inner tube by the first and second rings such that an inner surface of the outer tube is spaced a selected distance from the inner surface of the inner tube, an enclosed space being formed between the first and second rings and between the inner surface of the outer ring and the outer surface of the inner ring.

The heater mechanism is preferably mounted in the enclosed space in engagement with the outer surface of the inner tube and being spaced a distance from the inner surface of the outer tube.

The heater mechanism typically comprises a metal material connected to a source of electrical energy for controllably heating the metal material by controlled application of electrical energy to the metal material.

Further in accordance with the invention there is provided a heater assembly for mounting around a fluid flow channel in an injection molding apparatus, the heater assembly comprising: a tube comprising a first heat conductive material, the inner tube having a selected longitudinal length, an inner surface and an outer surface; a first ring having an inner surface engaged around the outer surface of the inner tube along short selected length of the longitudinal length of the inner tube; and a second ring having an inner surface engaged around the outer surface of the inner tube along second short selected length of the longitudinal length of the inner tube; and, a heater mechanism mounted around and in engagement with the outer surface of the inner tube.

DETAILED DESCRIPTION

Figure 1:
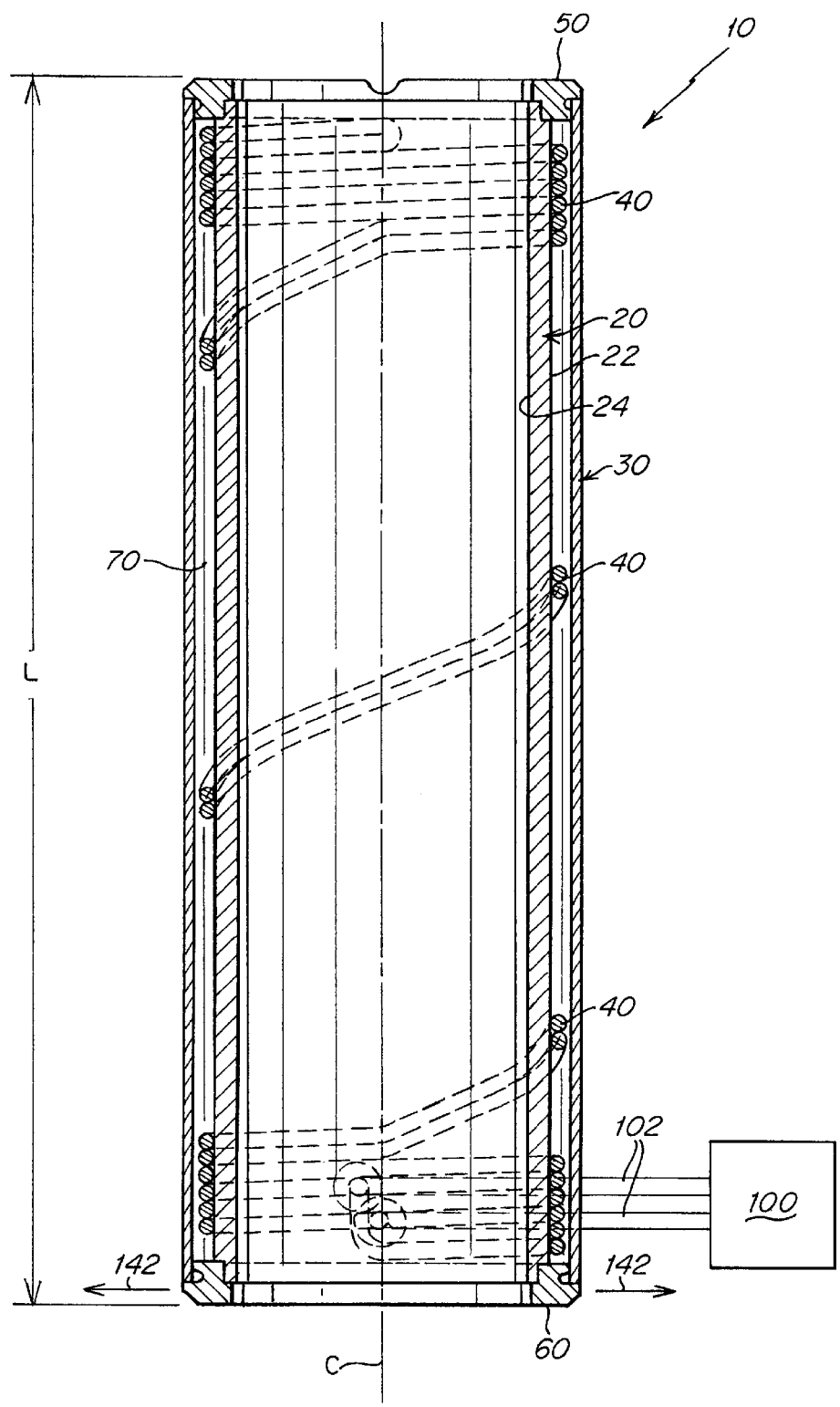
FIG. 1 is a side cross-sectional view of a heater apparatus according to the invention.

FIG. 1 shows a heater apparatus 10 according to the invention. The heater apparatus 10 comprises an inner tube 20 and an outer tube 30, both of the tubes typically being comprised of materials having the same or substantially the same coefficients of thermal expansion. The inner tube 20 is typically comprised of a material having a relatively high coefficient of thermal expansion such as copper, aluminum, and alloys therewith. The outer tube 30 is typically comprised of a heat reflective material such as stainless steel and alloys therewith. The materials comprising both tubes 20, 30 are preferably resistant to oxidation and corrosion. As shown, the inner 20 and outer 30 tubes are mounted at opposing terminal ends by rings 50, 60 in spaced relationship whereby an enclosed space 70 is formed between the inner surface 32 of the outer tube and the outer surface 22 of the inner tube 20.

The heater coils 40 are enclosed within the space 70 and are preferably mounted in contact engagement with the outer surface 22 of the inner tube 20 so as to most efficiently transmit heat energy to the body of the heat conductive material of which tube 20 is comprised. Heater coils 40 are connected by conventional electrical wiring 102 to a source of heat generating energy 100 such as an electrical voltage or current generator which can be readily controlled to transmit electrical energy to coils 40 and raise the temperature of the coils 40 to one or more preselected temperatures. Other sources of heat generation may alternatively be employed such as a fluid material which is controllably heated at a source location 100 and routed through tubes 40. The heater mechanism may alternatively be constructed in other formats such as heatable sheets or strips akin to coils 40 which wrap around the outer surface 22 of the inner tube 20.

Figure 5:
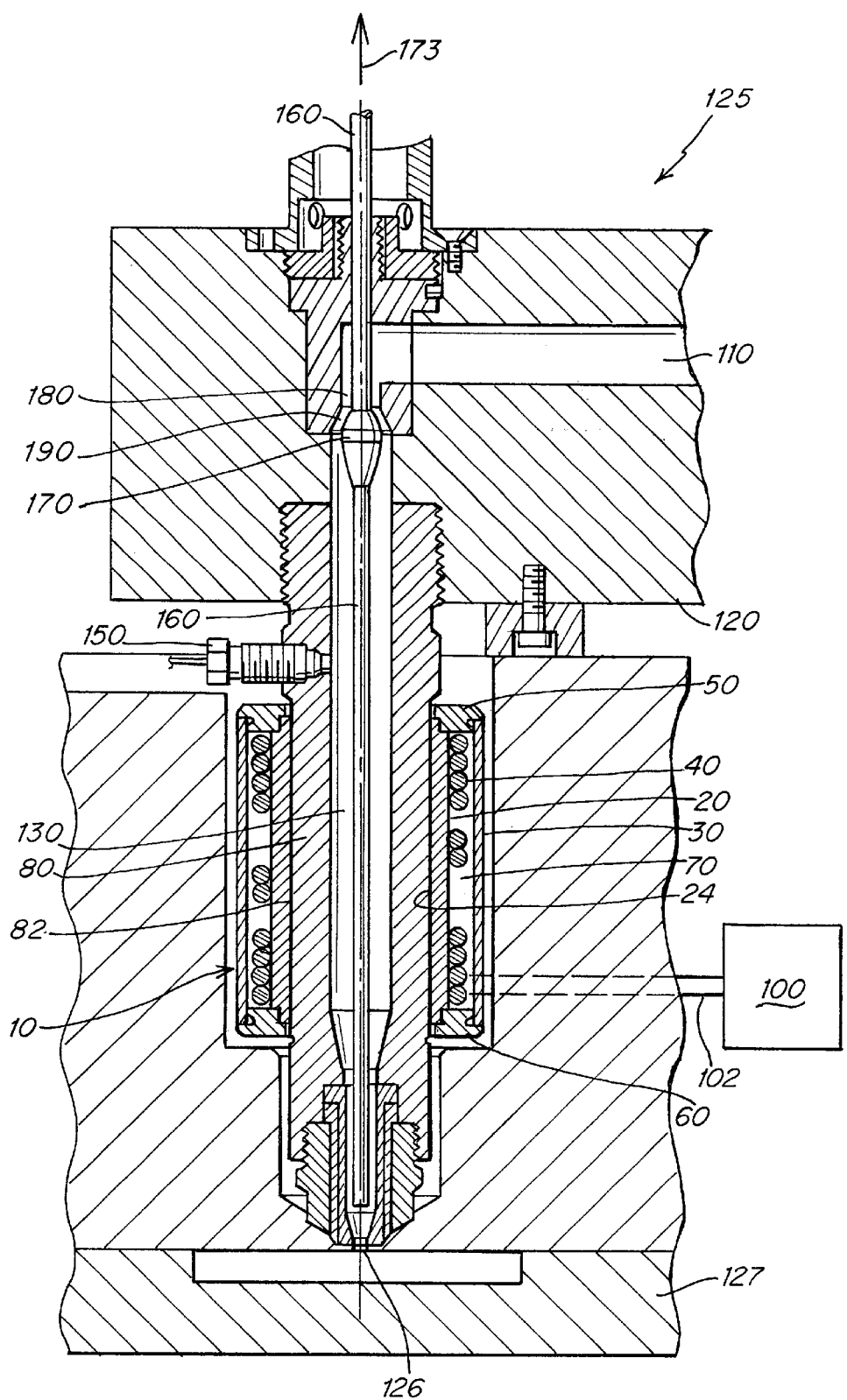
FIG. 5 is a schematic, side cross-sectional view of a portion of an injection molding apparatus showing a heater apparatus arranged/fitted around the downstream nozzle end of a fluid flow channel, where the nozzle has a controllably movable valve pin having a bulbous protrusion that restricts flow upon upstream movement of the pin.
Figure 7:
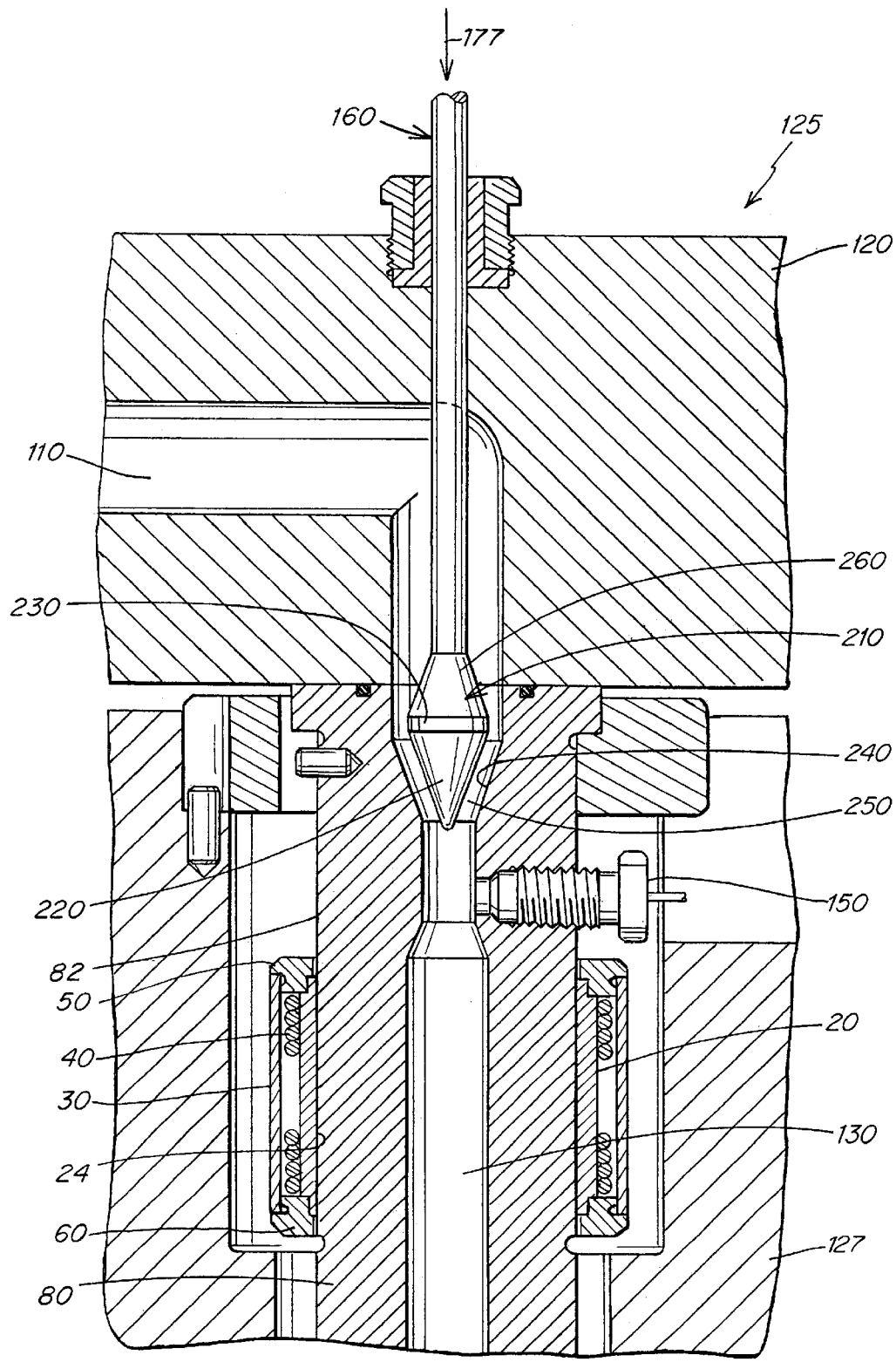
FIG. 7 is a schematic, side cross-sectional view of a portion of an injection molding apparatus showing a heater apparatus arranged/fitted around the downstream nozzle end of a fluid flow channel, where the nozzle has a controllably movable valve pin having a wedge shaped protrusion that restricts flow upon downstream movement of the pin.

As shown in FIGS. 5, 7, the inner surface 24 of inner tube 20 is fitted around the outer surface 82 of a nozzle body 80 that is mounted at an upstream end to sealably communicate with a fluid flow channel 110 of a heated fluid distribution manifold or hotrunner 120. The diameter A of inner tube 20 is typically configured to be essentially the same as or only very slightly larger at room temperature than the outer surface diameter of the nozzle body 80 such that nozzle body 80 is snugly received within the hollow interior of heater tube 20. The manifold 110 of the injection molding apparatus 125 is heated to an elevated temperature to maintain the fluid injected into the channel 120 in a readily fluid flow state. The heater assembly in the arrangement shown in FIGS. 5, 7 is positioned at a downstream position around the nozzle body 80 to continue to maintain the fluid at a selected elevated temperature as the fluid travels from channel 120 through the channel or bore 130 of nozzle 80. The heater coils 40 heat inner tube 20 which in turn heats nozzle body 80 which in turn heats fluid within channel 130.

Figure 2:
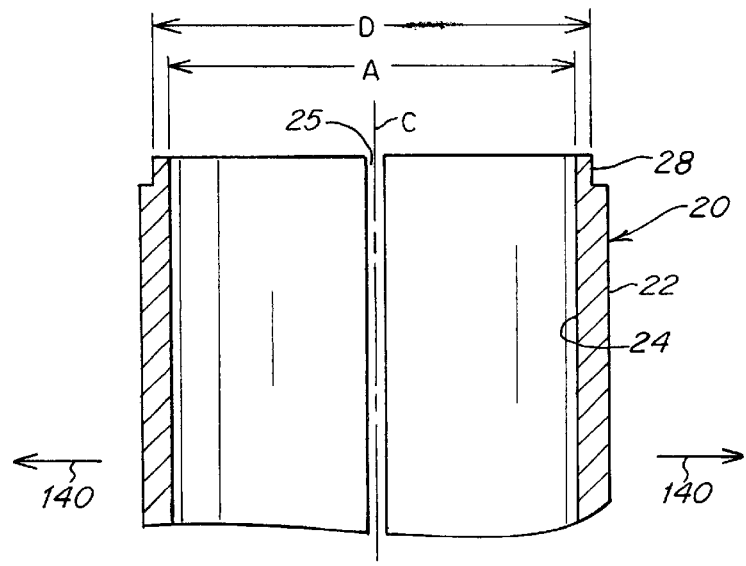
FIG. 2 is a side partially sectional view of the inner tube component of the FIG. 1 apparatus.
Figure 3A:
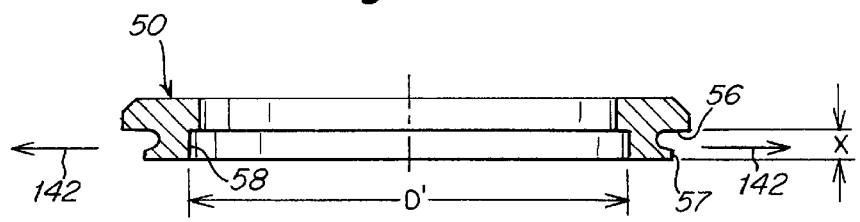
FIG. 3a is a side schematic cross-sectional view of a ring element of the FIG. 1 apparatus.
Figure 3:
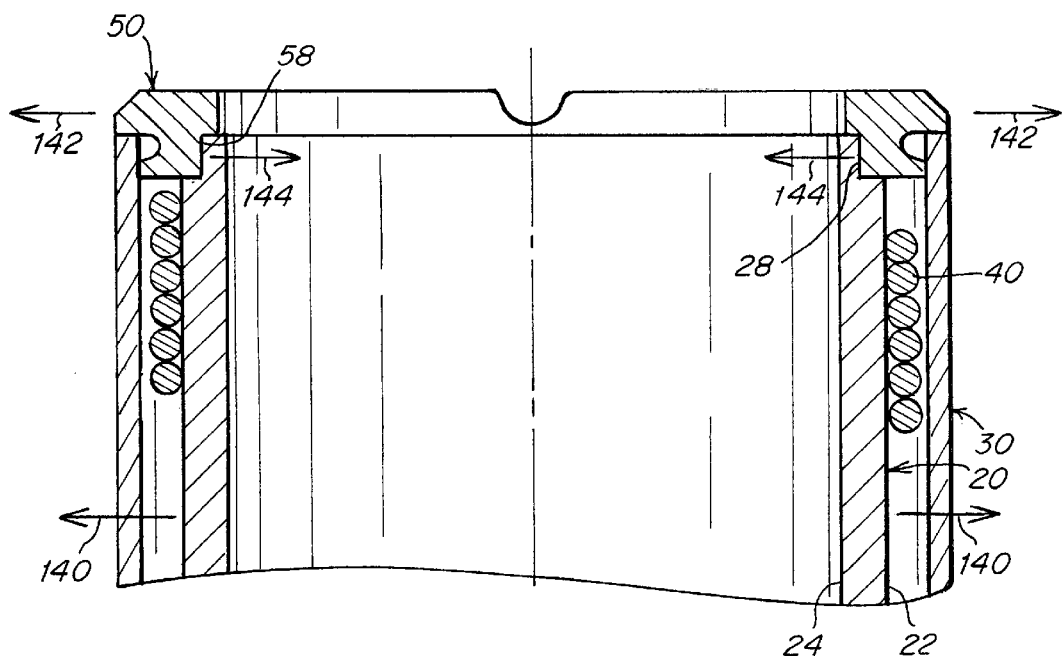
FIG. 3 is a close-up view of the upper end of the FIG. 1 apparatus showing the arrangement and fitting together of the inner and outer tube components relative to an end cap or ring component.
Figure 4:
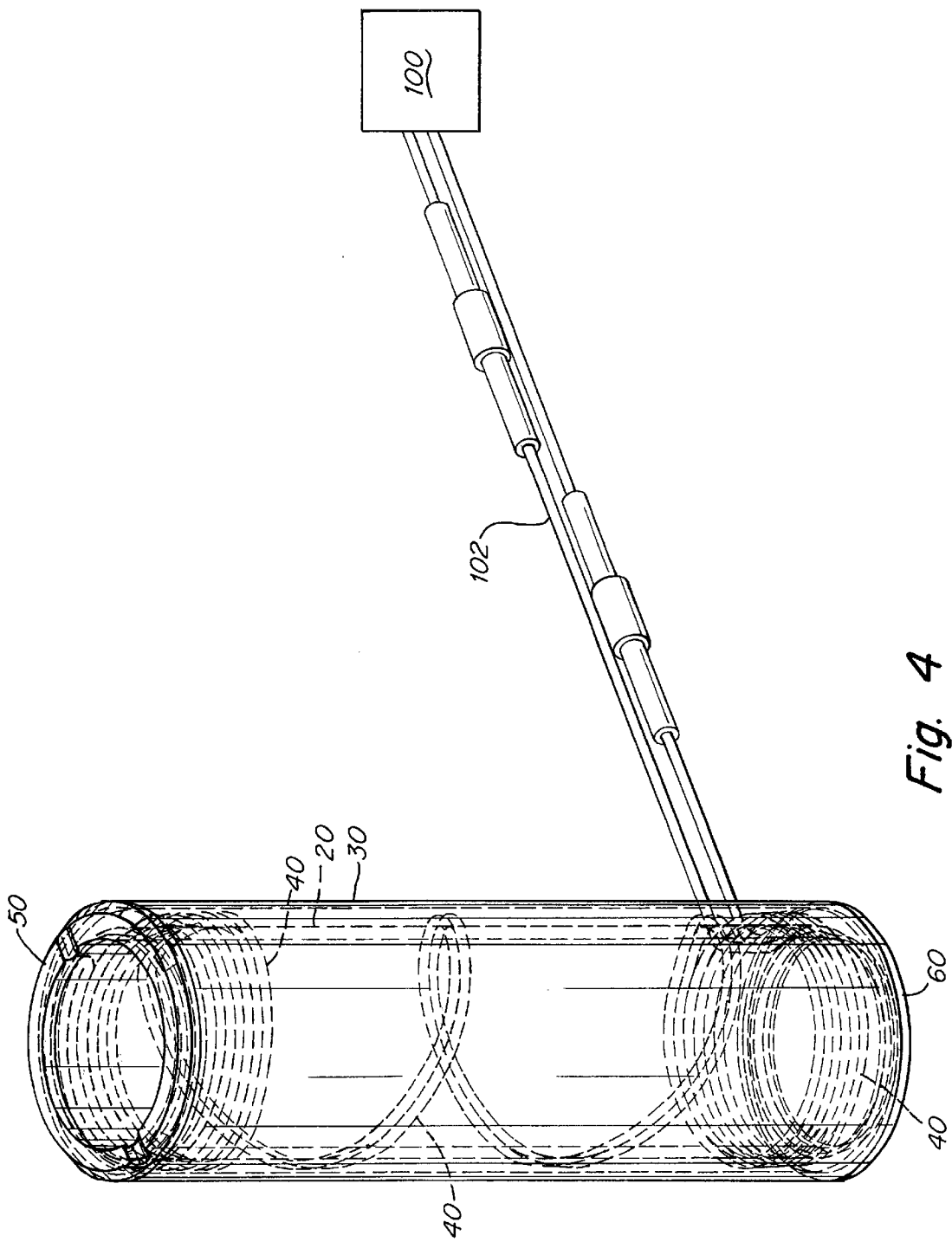
FIG. 4 is a transparent, perspective view of the FIG. 1 apparatus.

The inner heater tube 20 is comprised of a material, typically highly heat conductive metal such as steel, stainless steel, aluminum or other suitable metal material, that expands radially 140, FIGS. 2, 3 upon heating to elevated temperature. The rings 50, 60 also expand radially 142, FIGS. 1, 3 upon heating to an elevated temperature. However, the rings 50, 60 are comprised of a relatively low thermally expansive metal material, such as titanium, steel, stainless steel or other suitable metal, which has a coefficient of thermal expansion which is less than the coefficient of thermal expansion of the metal material of which the inner tube 20 is comprised. The rings 50, 60 thus restrain the higher radially expanding 140 inner tube by virtue of an inner circumferential surface 58, FIGS. 3, 3a of the rings being frictionally engaged around and against an opposing outer circumferential surface 28, FIGS. 2, 3 of the inner tube 20.

As shown in FIG. 2, the outer circumferential mounting surface 28 of inner tube 20 has a diameter D which is essentially the same or only very slightly smaller at room temperature than the inner circumferential diameter D, FIG. 3a, of the mating surface 28, FIGS. 3, 3a of the rings 50, 60. Upon heating of the apparatus 10, FIG. 1, the tube radially expands 140 to a greater degree than the rings 50, 60 radially expand 142 and thus the pressure between surfaces 58 and 28 increases as the apparatus is heated creating a radially inward force 144 by surface 58 against surface 28. The increased radially inward pressure force 144 created by rings 50, 60 against surface 28 of the inner tube 20, in turn, causes increased pressure of the inner circumferential surface 24 of tube 20 against the outer surface 82, FIGS. 5, 7 of the nozzle body 80 thus increasing the heat conductive contact area and heat conductive efficiency between inner tube 20 and nozzle body 80. The rings 50, 60 thus act to clamp the inner tube 20 against the outer surface of the nozzle 80 upon heating of the apparatus 10, 125 to operating temperatures.

The inner tube 20 is typically provided with a slot 25, FIG. 25, through the entire body width of tube 20 which allows the tube body 20 to more easily contract in circumference under the inward pressure force 144 being exerted on the outer circumferential surface of the tube 20 by rings 50, 60. As shown the slot 25 is parallel to the axis C of the tube 30, FIGS. 1, 2. The slot 25 may alternatively be slanted at an angle relative to axis C or curved, curvilinear, zig-zag or arranged in some other pattern relative to axis C other than the straight, parallel arrangement shown in FIG. 2.

As shown in FIGS. 1–7, the rings are mounted at the terminal opposing ends of the inner tube 20. The longitudinal length X, FIG. 3a, of the inner circumferential engagement surfaces 58 of the rings 50, 60 are very short or foreshortened relative to the overall longitudinal length L, FIG. 1, of the inner 20 and outer 30 tubes. Typically the longitudinal engagement length X, FIG. 3a, is less than about 10% of the total longitudinal length L of tube 20, and preferably less than about 5% and most preferably less than about 3%.

The inner engagement surface 58 of the rings 50, 60 may include screw teeth which are complementary with screw teeth provided on the outer mounting surface 28 of the heater tube 20 such that the rings 50, 60 may simply be screwed onto the top and bottom terminal ends of the tube 20. In such an arrangement, one screwably engageable ring 50 or 60 may be first screwed on to an end of the tube 20, then the outer ring 30 may be slid over the outside of tube 20 and one end of the outer tube 30 positioned against the abutment, mounting surfaces 56, 57, FIG. 3a, to assume the position of tube 30 shown in FIGS. 1, 3. After the outer tube is slid over the inner tube 20, the other of the rings may then be screwed onto the other end of the tube 20 and the other end of tube 30 positioned snugly against mounting surfaces 56, 57 of the other of rings 50, 60 such that tube 30 is stationarily held in the position shown in FIGS. 1, 3 relative to inner tube 20.

The inner enclosed space 70 is created by the assembly and mounting of the larger inner diameter outer tube 30 around the smaller outer diameter tube 20. The mounting and clamping rings 50, 60 enclose the air space 70 off from the outside environment which creates a somewhat insulated air space that becomes elevated in temperature and insulated from cooling influences that may be conducted to the heated metal structures 120, 80 which are in conductive contact with the mold body 127 which is being substantially cooled relative to the nozzle 80 and manifold 120 during an injection cycle.

The inner enclosed space 70 is maintained as heat retentive reservoir, in part by the outer tube 30 which reflects and retains heat within the space 70, by virtue of its inner surface 32 being spaced a certain radial distance away from both the heater coil elements 40 and the outer surface 22 of the inner tube 20. The outer tube 30 is typically comprised of a heat reflective metal material such as steel or stainless steel.

The rings 50, 60 are shown as being mountable/screwable onto the two opposing terminal ends of the tube 20. Alternatively the rings 50, 60 may be mounted, attached, screwed or otherwise connected to the outer surface of tube 20 at any position along the longitudinal length of tube 20.

The tubes 20, 30 and the rings 50, 60 are shown in the Figures in cylindrical format/design/configuration. The tubes and rings may have a variety of shapes in radial section such as square, oval, hexagonal, pentagonal or any other tubular shape that matches or is complementary to the outer circumference of the fluid flow channel structure that the heater assembly is intended to be mounted around. Also as shown in FIGS. 5, 7, the heater assembly is mounted around the more downstream end of the fluid flow channel, i.e. around the nozzle 80, which is immediately upstream of the gate of the mold 127, FIG. 5, into which the fluid is injected and eventually cooled during an injection cycle into a molded part. The heater assembly 10 may alternatively be mounted around any portion of any fluid flow channel in the system, e.g. around the hotrunner channel 110 or another fluid flow channel section that is configured to allow a tubular heater construction to be mounted around. Such a heater assembly may, for example, be mounted around the barrel (not shown) of an injection molding machine itself or around other nozzles that feed into other distribution channels or molds in a manifold or runner in the system.

Figure 6:
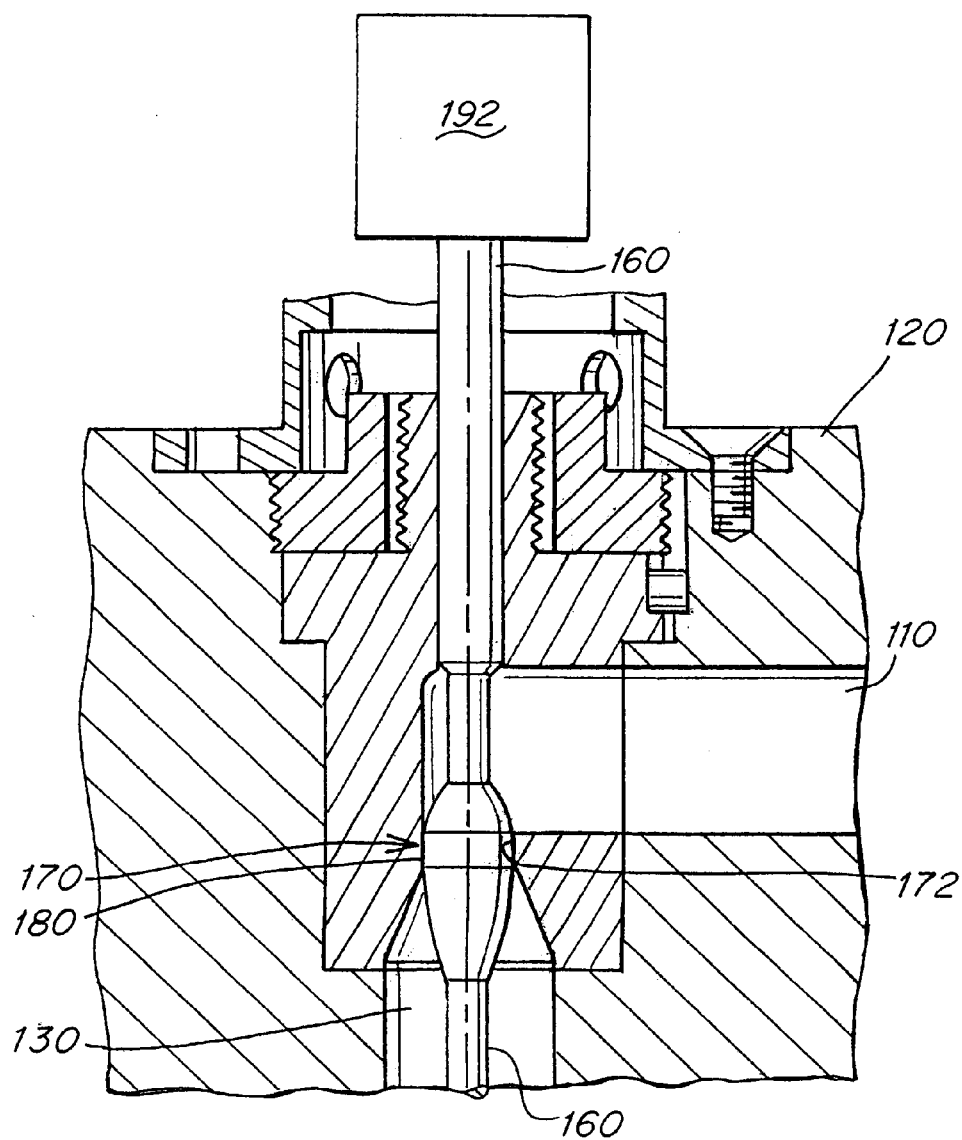
FIG. 6 is a closeup view of the bulbous protrusion portion of the valve pin show in the FIG. 5 apparatus showing the bulbous protrusion in a fluid flow stop position.

FIGS. 5–7 show exemplary embodiments of heater assemblies used in controllable fluid flow rate injection systems. In FIG. 5 for example, the heater assembly is engaged around a nozzle 80 having a valve pin 160 having a bulbous section 170 which controls the rate of fluid flow through the bore 130 of the nozzle by upstream movement 173 of the outside curvilinear surface of bulb 170 into the throat 180 of a restriction area in the flow channel 110, 130 leading to gate 126. The spacing 190 between the outside curvilinear surface of bulb 170 can be varied, and thus the flow rate varied, depending on the positioning of the bulb 170 relative to the inside surface of the channel 130 in the area of the throat 180. As shown in FIG. 6, the bulb 170 has a maximum diameter section 172 which upon full upstream withdrawal of pin 160 by controllable actuator 190 to the position shown in FIG. 6, the bulb maximum diameter section 172 engages the inside surface of the throat 180 section and fluid flow from channel 110 to bore/channel 130 is stopped. The heater assembly 10 assists in the course of an injection cycle being controlled by operation of actuator 190 which may be controlled by an algorithm utilizing a value corresponding to a sensed condition of the fluid flow provided by a sensor signal sent by a sensor such as sensor 150. In the FIGS. 5–7 embodiments, the heater assembly 10 assists in the injection cycle/process by maintaining the temperature at a desired level in a channel section 130 that is occasionally shut off from channel section 110. At such shut off periods, the fluid temperature in channel 110 may differ from the temperature in channel 130, and the temperature of nozzle body 80 may begin to cool relative to manifold 120.

In the FIG. 7 apparatus/embodiment the pin 160 has a flow controlling protrusion 210 having an upper conically shaped surface 260 and a lower conically shaped surface 220 and a maximum diameter section 230. Fluid flow is controlled, restricted and eventually stopped by downstream movement 177 of pin 160. Depending on the precise position of the outside surface of lower conical surface 220 of the pin protrusion 210 relative to the complementary conical receiving/mating surface 240 of the channel/bore 130, the size of the spacing 250 will be more or less and, in turn, the fluid flow from channel 110 to channel 130 will be more or less. When pin 160 moved fully forward/downstream to the point where surface 220 engages surface 240, fluid flow will be completely stopped. As in the FIG. 5 embodiment, axial movement of the pin 160 may be controlled by an algorithm using a variable based on a signal received from the sensor 150 which senses a condition of the fluid flowing in a channel 11, 130 or the like. Fluid conditions typically sensed are fluid pressure, temperature, flow rate, viscosity and the like.

What is claimed is:

1. A heater assembly for mounting around a fluid flow channel in an injection molding apparatus, the heater assembly comprising:

an inner tube comprising a first heat conductive material having a first coefficient of thermal expansion, the inner tube having a selected longitudinal length, an inner surface, an outer surface;

a first ring having an inner surface engaged around the outer surface of the inner tube along short selected length of the longitudinal length of the inner tube, the first ring comprising a second material having a second coefficient of thermal expansion that is less than the first coefficient of thermal expansion;

a heater mechanism that heats the inner tube to a selected elevated temperature.

2. The heater assembly of claim 1 further comprising an outer tube receiving and mounted around the outer surface of the inner tube, the first ring mounting the outer tube in a fixed position around the outer surface of the inner tube, the outer tube being mounted such that an inner surface of the outer tube is spaced a distance from the outer surface of the inner tube.

3. The heater assembly of claim 2 wherein the heater mechanism is mounted within the space between the inner ring and the outer ring.

4. The heater assembly of claim 3 further comprising a second ring having an inner surface engaged around the outer surface of the inner tube along a second short selected length of the longitudinal length of the inner tube, the second ring comprising a third material having a third coefficient of thermal expansion that is less than the first coefficient of thermal expansion.

5. The heater assembly of claim 4 wherein the second ring mounts the outer tube in the fixed position around the outer surface of the inner tube in cooperation with the first ring.

6. The heater assembly of claim 4 wherein the second material and the third material have the same or substantially the same coefficient of thermal expansion.

7. The heater assembly of claim 1 wherein the short selected length extends from a first terminal end of the inner tube, the first ring being mounted at and around the first terminal end of the inner tube.

8. The heater assembly of claim 4 wherein the second short selected length extends from a second terminal end of the inner tube, the second ring being mounted at and around the second terminal end of the inner tube.

9. The heater assembly of claim 4 wherein the short selected length extends from a first terminal end of the inner tube, the first ring being mounted at and around the first terminal end of the inner tube and wherein the second short selected length extends from a second terminal end of the inner tube, the second ring being mounted at and around the second terminal end of the inner tube.

10. The heater assembly of claim 1 wherein the inner tube and the first ring expand radially upon heating to select elevated temperatures, the second material of the first ring being selected such that the first ring expands less radially than the inner tube expands radially upon said heating, the first ring restricting radial expansion upon said heating.

11. The heater assembly of claim 4 wherein the inner tube and the second ring expand radially upon heating to select elevated temperatures, the third material of the second ring being selected such that the second ring expands less radially than the inner tube expands radially upon said heating, the second ring restricting radial expansion upon said heating.

12. The heater assembly of claim 4 wherein the inner tube and the first ring expand radially upon heating to select elevated temperatures, the second material of the first ring being selected such that the first ring expands less radially than the inner tube expands radially upon said heating, the first ring restricting radial expansion of the inner tube upon said heating; and, wherein the inner tube and the second ring expand radially upon heating to select elevated temperatures, the third material of the second ring being selected such that the second ring expands less radially than the inner tube expands radially upon said heating, the second ring restricting radial expansion of the inner tube upon said heating.

13. The heater assembly of claim 1 wherein the inner tube includes a slot extending the longitudinal length of the inner tube.

14. A heater assembly for mounting around a fluid flow channel in an injection molding apparatus, the heater assembly comprising:

an inner tube comprising a first heat conductive material, the inner tube having a selected longitudinal length, an inner surface, an outer surface;

a first ring having an inner surface engaged around the outer surface of the inner tube along short selected length of the longitudinal length of the inner tube extending from a first terminal end of the inner tube;

a second ring having an inner surface engaged around the outer surface of the inner tube along second short selected length of the longitudinal length of the inner tube extending from a second terminal end of the inner tube;

an outer tube receiving and mounted around the outer surface of the inner tube by the first and second rings such that an inner surface of the outer tube is spaced a selected distance from the inner surface of the inner tube, an enclosed space being formed between the first and second rings and between the inner surface of the outer ring and the outer surface of the inner ring;

a heater mechanism mounted in the enclosed space.

15. The heater assembly of claim 14 wherein the heater mechanism is mounted in the enclosed space in engagement with the outer surface of the inner tube and being spaced a distance from the inner surface of the outer tube.

16. The heater assembly of claim 15 wherein the heater mechanism comprises a metal material connected to a source of electrical energy for controllably heating the metal material by controlled application of electrical energy to the metal material.

17. The heater assembly of claim 14 wherein the inner tube comprises a first material, the first ring comprises a second material and the second ring comprises a third material, and wherein the coefficient of thermal expansion of the second and third materials is less than the coefficient of thermal expansion of the first material.

18. The heater assembly of claim 14 wherein the inner tube and the first ring expand radially upon heating to select elevated temperatures the inner tube comprising a first material, the first ring comprising a second material and the second ring comprising a third material, the second material of the first ring being selected such that the first ring expands less radially than the inner tube expands radially upon said heating, the first ring restricting radial expansion of the inner tube upon said heating; and, wherein the inner tube and the second ring expand radially upon heating to select elevated temperatures, the third material of the second ring being selected such that the second ring expands less radially than the inner tube expands radially upon said heating, the second ring restricting radial expansion of the inner tube upon said heating.

19. A heater assembly for mounting around a fluid flow channel in an injection molding apparatus, the heater assembly comprising:

a tube comprising a first heat conductive material, the inner tube having a selected longitudinal length, an inner surface and an outer surface;

a first ring having an inner surface engaged around the outer surface of the inner tube along short selected length of the longitudinal length of the inner tube;

a second ring having an inner surface engaged around the outer surface of the inner tube along second short selected length of the longitudinal length of the inner tube;

a heater mechanism mounted around and in engagement with the outer surface of the inner tube.

20. The heater assembly of claim 19 wherein the tube comprises a first material having a first coefficient of thermal expansion, the first ring comprises a second material having a second coefficient of thermal expansion and the second ring comprises a third material having a third coefficient of thermal expansion, the first coefficient of thermal expansion being greater the second and the third coefficients of thermal expansion.

21. The heater assembly of claim 19 wherein the tube and the first ring expand radially upon heating to select elevated temperatures, the tube comprising a first material, the first ring comprising a second material and the second ring comprising a third material, the second material of the first ring being selected such that the first ring expands less radially than the tube expands radially upon said heating, the first ring restricting radial expansion of the tube upon said heating; and, wherein the tube and the second ring expands radially upon heating to select elevated temperatures, the third material of the second ring being selected such that the second ring expands less radially than the tube expands radially upon said heating, the second ring restricting radial expansion of the tube upon said heating.

* * * * *

UNITED STATES PATENT AND TRADEMARK OFFICE
CERTIFICATE OF CORRECTION

PATENT NO. : 6,683,283 B2
DATED : January 27, 2004
INVENTOR(S) : Harald Schmidt

It is certified that error appears in the above-identified patent and that said Letters Patent is hereby corrected as shown below:

<u>Title page,</u>
Item [73], Assignee, remove entire assignee.

Signed and Sealed this

Thirteenth Day of July, 2004

JON W. DUDAS
*Acting Director of the United States Patent and Trademark Office*